United States Patent
Shih et al.

(10) Patent No.: US 9,013,160 B2
(45) Date of Patent: Apr. 21, 2015

(54) POWER SUPPLYING CIRCUIT AND POWER SUPPLYING METHOD

(75) Inventors: Yi-Chang Shih, Hsinchu (TW); Yi-Shao Chang, Kaohsiung (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 320 days.

(21) Appl. No.: 13/556,213

(22) Filed: Jul. 24, 2012

(65) Prior Publication Data

US 2013/0027011 A1    Jan. 31, 2013

(30) Foreign Application Priority Data

Jul. 29, 2011  (TW) .............................. 100126985 A

(51) Int. Cl.
G05F 1/575 (2006.01)
G05F 1/46 (2006.01)
H02M 1/44 (2007.01)
H02M 3/156 (2006.01)
H02M 1/15 (2006.01)
H02M 1/00 (2006.01)

(52) U.S. Cl.
CPC ................. *G05F 1/467* (2013.01); *H02M 1/44* (2013.01); *G05F 1/575* (2013.01); *H02M 3/156* (2013.01); *H02M 1/15* (2013.01); *H02M 2001/0025* (2013.01)

(58) Field of Classification Search
CPC ........... G05F 1/467; G05F 1/56; G05F 1/575; H02M 1/44; H02M 2001/0025; H02M 1/15; H02M 3/156
USPC .................................. 323/273, 275, 280, 281
See application file for complete search history.

(56) References Cited

U.S. PATENT DOCUMENTS

| | | | |
|---|---|---|---|
| 4,983,905 A * | 1/1991 | Sano et al. ..................... | 323/274 |
| 5,162,668 A | 11/1992 | Chen | |
| 5,861,736 A * | 1/1999 | Corsi et al. ..................... | 323/273 |
| 6,459,246 B1 * | 10/2002 | Roo ............................... | 323/270 |
| 6,483,727 B2 * | 11/2002 | Oki et al. ........................ | 363/39 |

(Continued)

FOREIGN PATENT DOCUMENTS

| EP | 2 031 476 B1 | 1/2011 |
|---|---|---|
| EP | 1552618 B1 | 5/2011 |

(Continued)

OTHER PUBLICATIONS

Hoon, A Low Noise, High Power Supply Rejection Low Dropout Regulator for Wireless System-on-Chip Applications, 2005.

(Continued)

*Primary Examiner* — Fred E Finch, III
(74) *Attorney, Agent, or Firm* — Winston Hsu; Scott Margo

(57) ABSTRACT

A power supplying circuit for generating an output voltage, which comprises: a noise detecting circuit, for receiving a first reference voltage and for generating a second reference voltage according to the output voltage and the first reference voltage, wherein a noise component of the second reference voltage is the same as which of the output voltage; a control voltage generating unit, for receiving a feedback voltage and the second reference voltage, and for generating a control voltage according to the feedback voltage and the second reference voltage; a voltage providing device, for generating the output voltage according to the control voltage and an input voltage; and a feedback module, for generating the feedback voltage according to the output voltage.

15 Claims, 7 Drawing Sheets

(56) References Cited

U.S. PATENT DOCUMENTS

| | | | |
|---|---|---|---|
| 6,522,114 B1* | 2/2003 | Bakker et al. | 323/282 |
| 6,541,946 B1 | 4/2003 | Chen | |
| 6,603,293 B2* | 8/2003 | Knoedgen | 323/280 |
| 6,897,637 B2 | 5/2005 | Chen | |
| 7,508,181 B2* | 3/2009 | Chen et al. | 323/282 |
| 2009/0015221 A1* | 1/2009 | Kodera | 323/279 |
| 2010/0039082 A1* | 2/2010 | Xie et al. | 323/281 |
| 2010/0117609 A1* | 5/2010 | Koleno | 323/273 |
| 2010/0164442 A1* | 7/2010 | Vikinski et al. | 323/234 |
| 2012/0313597 A1* | 12/2012 | Hunter et al. | 323/280 |

FOREIGN PATENT DOCUMENTS

| | | |
|---|---|---|
| TW | 200607219 | 2/2006 |
| TW | M386518 | 8/2010 |
| TW | 201115296 | 5/2011 |
| TW | 201120604 | 6/2011 |

OTHER PUBLICATIONS

El-Nozahi, High PSR Low Drop-Out Regulator With Feed-Forward Ripple Cancellation Technique, 2010.

* cited by examiner

POWER SUPPLYING CIRCUIT AND POWER SUPPLYING METHOD

BACKGROUND OF THE INVENTION

1. Field of the Invention

The present invention relates to a power supplying circuit and a power supplying method, and particularly relates to a power supplying circuit and a power supplying method that can restrain noise.

2. Description of the Prior Art

High-integrated SOC (System On a Chip) always includes an analog circuit and a digital circuit. However, the noise to the power source, which is generated by the digital circuit, may decreases the performance of the analog circuit. Additionally, the noise to the power source, which is generated by the power amplifier or the switching regulator integrated in the chip, may affect other circuits. Therefore, the stability of power supplying should be seriously concerned if the SOC is desired to have the best performance. Accordingly, the sub circuit of the SOC needs a power regulator to resist the disturbance of the power noise. In view of above-mentioned argument, it is an importance subject to provide a voltage regulator that has low voltage drop but high power noise reduction.

In order to solve above-mentioned problems, some solutions are developed but always have disadvantages hard to be overcome. For example, in the U.S. patent with a U.S. Pat. No. 5,162,668, a charge pump is utilized to increase the power supplying of the high voltage regulator, thereby the voltage drop between the power supplying and the output voltage rises. However, not only the extra circuits increase power consumption and circuit region, the extra clock signals also generate disturbance to other circuits. Also, in the U.S. patent with a U.S. Pat. No. 6,541,946B1, a high pass filter is utilized to add the power supplying noise to a control loop of the voltage regulator. However, low frequency power supplying noise reduction can not be improved since the low frequency noise can not be responded in the control loop of the voltage regulator. If such effect is desired, a large circuit region is necessary. Furthermore, in the U.S. patent with a U.S. Pat. No. 6,897,637B2 and the IEEE paper of S. K. HOON, a voltage subtractor is added to the voltage regulator loop such that the power supplying noise is directly feed backed to the power transistor. However, such mechanism has limited power supplying reduction improvement, according to theoretically inference or actual experiment data, thus does not match high noise reduction requirement for modern SOCs. Moreover, in the IEEE 2010 paper of Mohamed El-Nozahi, a Feed-forward Amplifier is utilized to add a power supplying noise neutralization path. The main disadvantage thereof is that an external capacitor is needed such that the dominant pole is designed outside the chip to maintain the loop stability. However, the cost and PCB (printed circuit board) region accordingly rise, such that the low cost and high integration requirement of the modern SOC can not be matched.

SUMMARY OF THE INVENTION

Therefore, one objective of the present invention is to provide a power supplying circuit and a power supplying method having noise restraining ability.

One embodiment of the present invention discloses a power supplying circuit for generating an output voltage. The power supplying circuit comprises: a noise detecting circuit, for receiving a first reference voltage and for generating a second reference voltage according to the output voltage and the first reference voltage, wherein a noise component of the second reference voltage is the same as which of the output voltage; a control voltage generating unit, for receiving a feedback voltage and the second reference voltage, and for generating a control voltage according to the feedback voltage and the second reference voltage; a voltage providing device, for generating the output voltage according to the control voltage and an input voltage; and a feedback module, for generating the feedback voltage according to the output voltage.

Another embodiment of the present invention discloses a power supplying method applied to a power supplying circuit, for generating an output voltage. The power supplying method comprises: generating a feedback voltage according to the output voltage; generating a second reference voltage according to the output voltage and a first reference voltage, wherein a noise component of the second reference voltage is the same as which of the output voltage; generating a control voltage according to the feedback voltage and the second reference voltage; and generating the output voltage according to the control voltage and an input voltage.

In view of above-mentioned embodiments, the present invention can utilize an easy mechanism to restrain output voltage noise, to provide stable output voltage.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
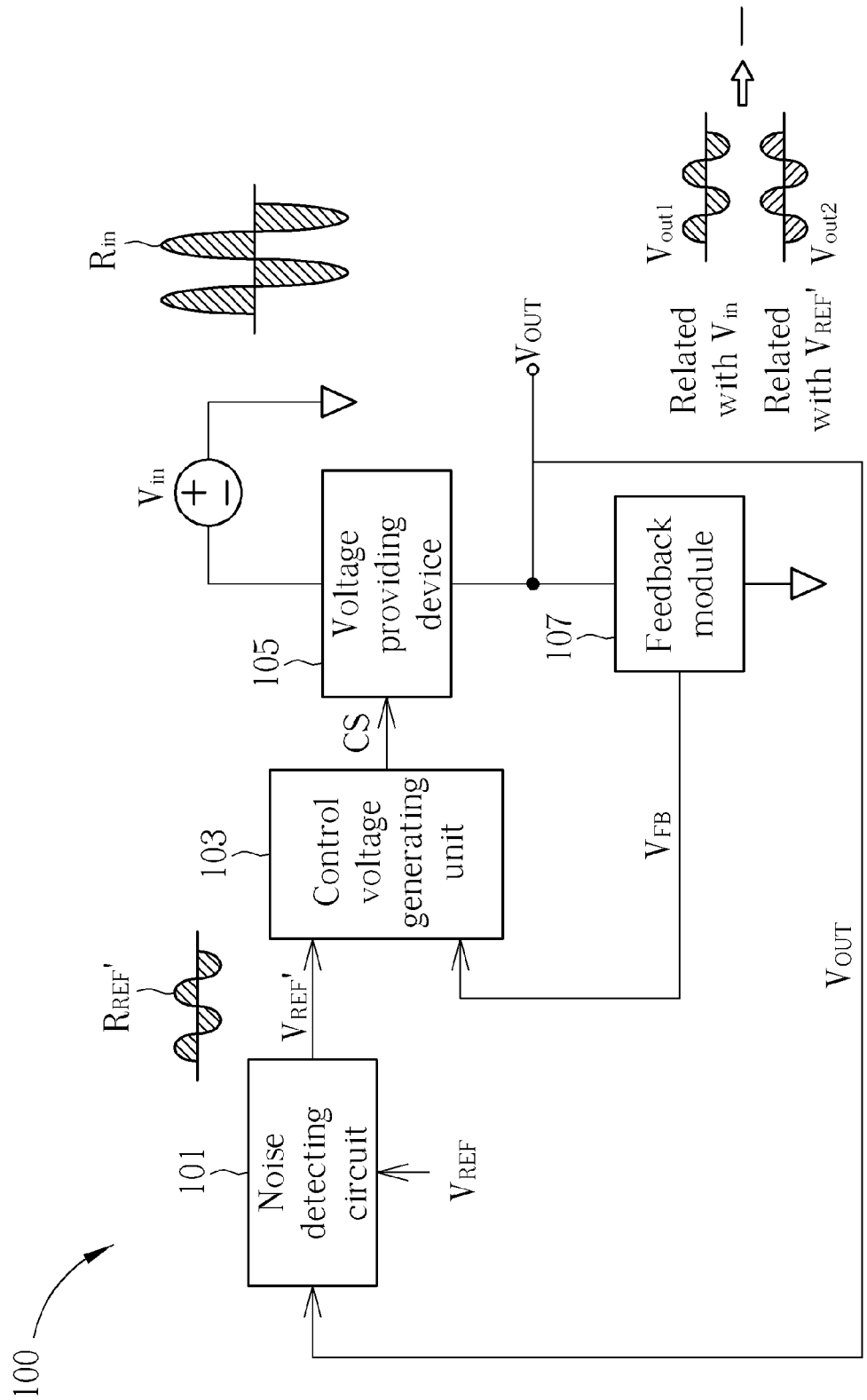
FIG. 1 is a block diagram illustrating a power supplying circuit according to an embodiment of the present invention.

Please refer to FIG. 1, which is a block diagram illustrating a power supplying circuit according to an embodiment of the present invention. As shown in FIG. 1, the power supplying circuit 100 includes a noise detecting circuit 101, a control voltage generating unit 103, a voltage providing device 105 and a feedback module 107. The noise detecting circuit 101 receives a first reference voltage $V_{REF}$ and an output voltage $V_{out}$, and generates a second reference voltage $V_{REF'}$ according to the output voltage $V_{out}$ and the first reference voltage $V_{REF}$. The noise component of the second reference voltage $V_{REF'}$ is related to the noise component of the output voltage $V_{out}$. That is, the noise component of the second reference voltage $V_{REF'}$ includes information of the noise component of the output voltage $V_{out}$, which will be detailedly depicted in the following embodiments. In this embodiment, the noise information includes ripple noise. The control voltage generating unit 103 receives a feedback voltage $V_{FB}$ and the second reference voltage $V_{REF'}$ and generates a control voltage CS according to the feedback voltage $V_{FB}$ and the second reference voltage $V_{REF'}$. The voltage providing device 105 generates the output voltage $V_{out}$ according to the control voltage CS and an input voltage $V_{in}$. The feedback module 107 generates the feedback voltage $V_{FB}$ according to the output voltage $V_{out}$. Besides, the noise detecting circuit 101 and the control voltage generating unit 103 can receive the input voltage $V_{in}$ as the operating voltage or the power supplying voltage thereof.

In view of above-mentioned embodiment, it can be understood that $V_{in}$ includes the noise component $R_{in}$, therefore the output voltage component $V_{out1}$ related to $V_{in}$ can be generated via the voltage supplying device 105. $V_{out1}$ includes the noise component corresponding to the noise component $R_{in}$. The noise detecting circuit 101 accordingly generates a second reference voltage $V_{REF'}$ having an inverted phase of $V_{out}$ after detecting $V_{out}$. The control voltage generating unit 103 generates the control voltage CS according to the second reference voltage $V_{REF'}$ and the feedback voltage $V_{FB}$, therefore the output voltage component $V_{out2}$ related to the second reference voltage $V_{REF'}$ can be generated via the voltage supplying device 105. Since the second reference voltage $V_{REF'}$ also includes the noise component $R_{REF'}$, the output voltage component $V_{out2}$ also includes a corresponding noise component. However, the noise component of the output voltage component $V_{out2}$ has an inverted phase of which of the output voltage component $V_{out1}$, thus the noise components can be neutralized. By this way, an output signal $V_{out}$ with no noise can be acquired.

Figure 2:
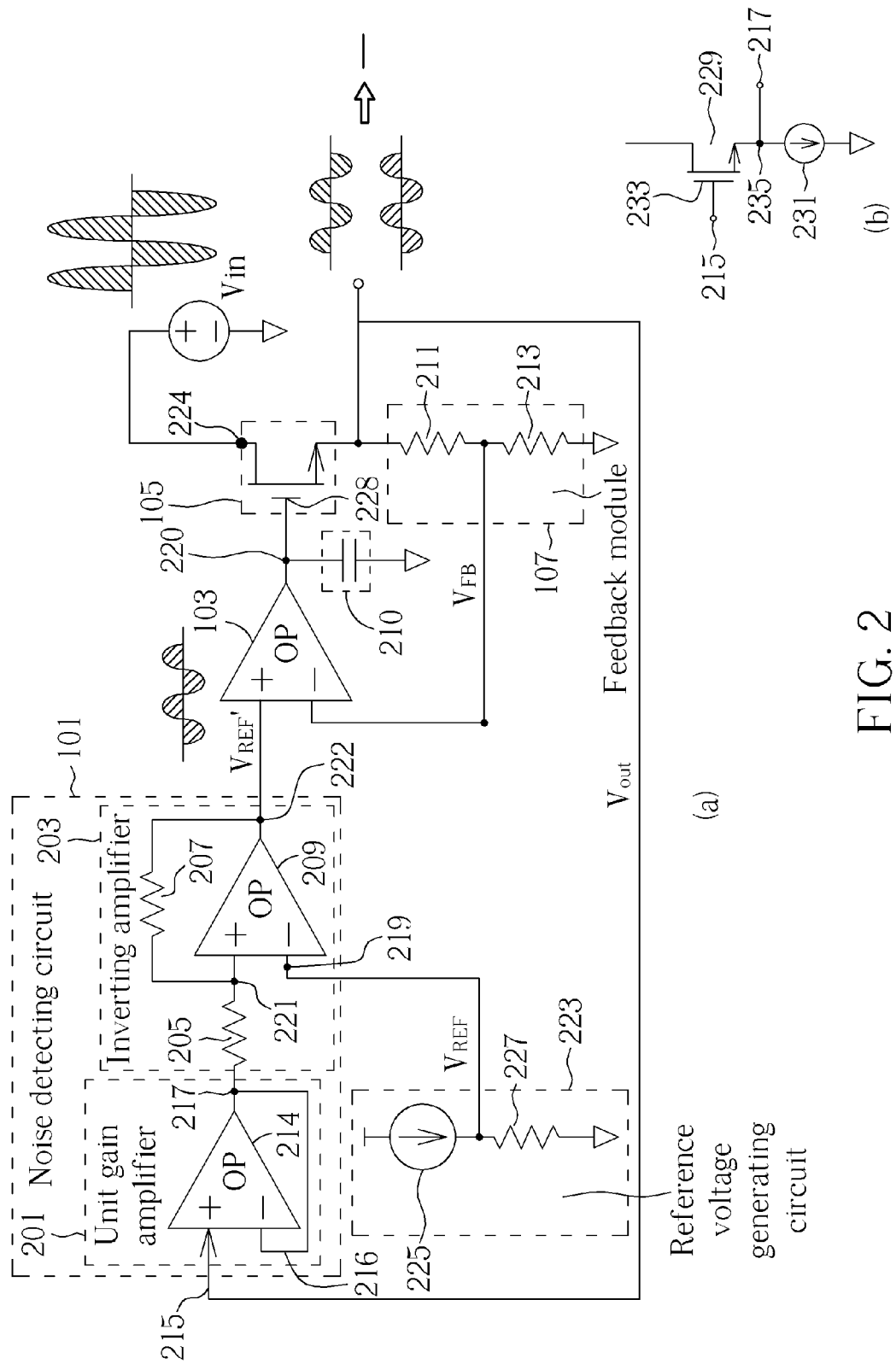
FIG. 2 and FIG. 3 are detail circuit diagrams for the power supplying circuit shown in FIG. 1 according to the present invention.

FIG. 2(a) is a detail circuit diagrams for the power supplying circuit shown in FIG. 1 according to the present invention. It should be noted that the following detail circuit diagram is only for example but does not mean to limit the scope of the present invention. Persons skilled in the art can change the circuit according to the teaching of the present invention to acquire the same function. Such variation should also fall in the scope of the present invention. In the power supplying circuit 200 shown of FIG. 2(a), the noise detecting circuit 101 includes a unit gain amplifier 201 and an inverting amplifier 203. The control voltage generating unit 103 serves as an error amplifier. The voltage providing device 105 is exemplarily an N type MOSFET, but is not limited, and may be implemented by a BJT. Also, the feedback module 107 is a resistor net, but is not limited. Furthermore, the first reference voltage $V_{REF}$ is generated by a reference voltage generating circuit 223. Besides, the power supplying circuit 200 may further include a capacitor 210 having a terminal coupled to an output terminal 220 of the control voltage generating unit 103 and a gate terminal of the voltage supplying device 105, and having another terminal coupled to a predetermined voltage level (in this example, a ground level). The main function of the capacitor 210 is utilized as a dominant pole capacitor to generate a dominant pole. That is, the noise detecting circuit 101, the control voltage generating unit 103, the power supplying device 105, the feedback module 107 and the capacitor 210 can be provided in a single chip. By this way, the stability of the whole loop in the chip can be increased. Please note that the method to increase the stability for the whole loop is not limited to such mechanism.

The unit gain amplifier 201 includes an operational amplifier 214 having an input terminal 215 for receiving the output voltage $V_{out}$, and another input terminal 216 coupled to the output terminal 217 thereof. The unit gain amplifier 201 is utilized to buffer the signal of the input terminal 215. It has substantially the same signals at the input terminal 215 and the output terminal 217. The main function of the unit gain amplifier 201 is to isolate the effect that the resistor of the inverting amplifier 203 and the resistor of the feedback module 107 cause to each other. Therefore the unit gain amplifier 201 can be removed or be replaced with other circuits. For example, the circuit shown in FIG. 2(b), which includes a switch device 229 and a current source 231, can reach the same function. The switch device 229 includes a control terminal 233 for receiving the output voltage $V_{out}$ and an output terminal 235 coupled to the second input terminal 221 of the inverting amplifier 203. One terminal of the current source 231 is coupled to an output terminal 235 of the switch device 235, and another terminal thereof is coupled to a predetermined voltage level (in this example, a ground level).

In this embodiment, the inverting amplifier 203 comprises a first input terminal 219 and a second input terminal 221. The first input terminal 219 receives the first reference voltage $V_{REF}$. The second input terminal 221 receives the signal output from the output terminal of the unit gain amplifier 201, which is substantially the same as the output voltage $V_{out}$, and accordingly generates the second reference voltage $V_{REF'}$. In one embodiment, the inverting amplifier 203 comprises two resistors 205, 207 and an operational amplifier 209. The resistor 205 is connected in series between the output terminal 217 of the unit gain amplifier 201 and the second input terminal 221. Also, the resistor 207 is connected in series between the second input terminal 221 and the output terminal 222. However, please note that other types of inverting amplifiers can also be applied to the present invention.

In this embodiment, the control voltage generating unit 103 serves as an error amplifier having two input terminals for respectively receiving the second reference signal $V_{REF'}$ and the feedback voltage $V_{FB}$, and for generating the control voltage CS according to the error between the second reference voltage signal $V_{REF'}$ and the feedback voltage $V_{FB}$. The voltage providing device 105 is an N type MOSFET, which includes a gate terminal 228 receiving the control voltage CS, a drain terminal 224 receiving the input voltage $V_{in}$ and a source terminal outputting the output voltage $V_{out}$. The feedback module 107 includes the resistor 211 and 213, which have a connection there between to output the feedback voltage $V_{FB}$. The reference voltage generating circuit 223 includes a constant current source 225 and a resistor 227, which have a connection there between to output the first reference voltage $V_{REF}$.

Figure 3:
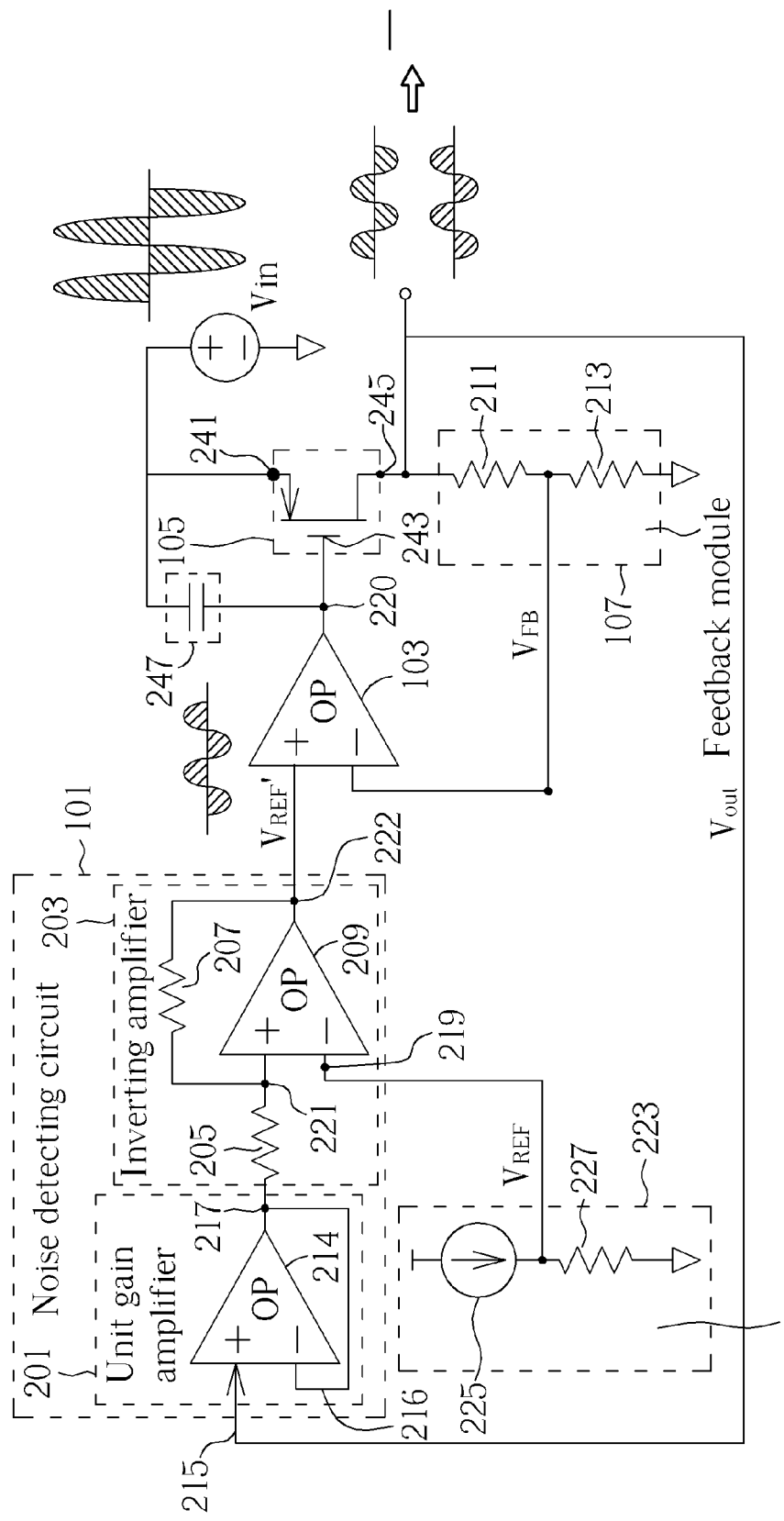

FIG. 3 is an extension embodiment for which shown in FIG. 2(a). In the embodiment shown in FIG. 2(a), the voltage providing device 105 is an N type MOSFET. However, the voltage providing device 105 in FIG. 3 is a P type MOSFET, which includes a gate terminal 243 receiving the control voltage CS, a source terminal 241 receiving the input voltage $V_{in}$ and a drain terminal 245 outputting the output voltage $V_{out}$. Additionally, the location for the dominant pole capacitor in the embodiment shown in FIG. 3 is different from which of the embodiment shown in FIG. 2(a). The capacitor 247 in FIG. 3 serves as a dominant capacitor, which has a terminal coupled to an output terminal 220 of the control voltage generating unit 103 and a gate terminal 243 of the voltage providing device 105, and has another terminal coupled to a source terminal 241 (or the input voltage $V_{in}$) of the voltage providing device 105. Other detail operations for the embodiment shown in FIG. 3 is the same as which of FIG. 2(a), thus it is omitted for brevity here. Besides, the unit gain amplifier 201 in FIG. 3 can be replaced with the circuit shown in FIG. 2(b).

Figure 4:
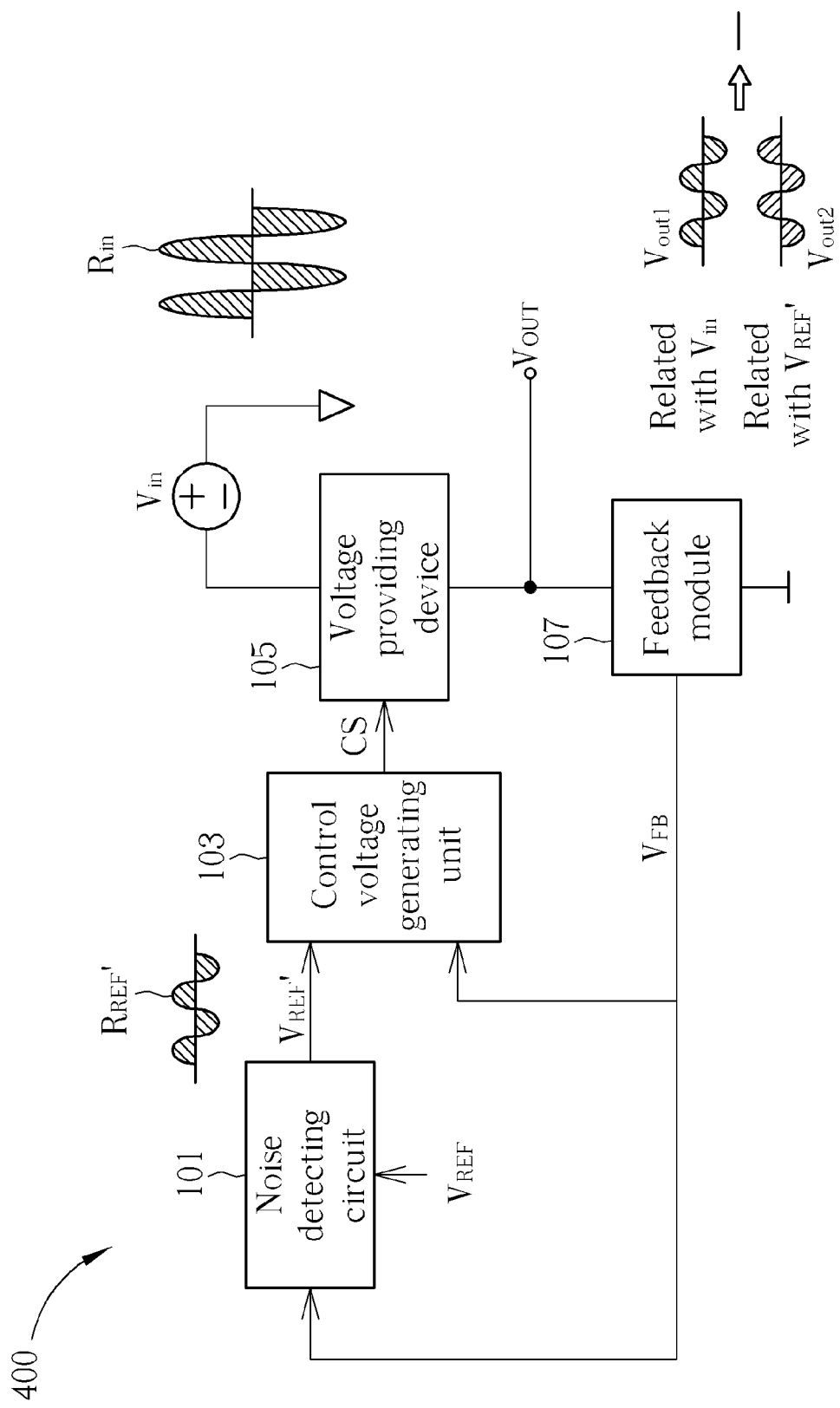
FIG. 4 is a block diagram illustrating a power supplying circuit according to another embodiment of the present invention.

FIG. 4 is a block diagram illustrating a power supplying circuit 400 according to another embodiment of the present invention, which is an extension embodiment for the embodiment shown in FIG. 1. The power supplying circuit 400 shown in FIG. 4 and the power supplying circuit 100 shown in FIG. 1 both include the noise detecting circuit 101, the control voltage generating unit 103, the voltage providing device 105 and the feedback module 107. One difference between two embodiments is that the noise detecting circuit 101 in FIG. 1 receives the output voltage $V_{out}$, but the noise detecting circuit 101 in FIG. 4 receives the feedback voltage $V_{FB}$. Accordingly, the noise detecting circuit 101 in FIG. 4 generates the second reference voltage $V_{REF'}$ according to the feedback voltage $V_{FB}$ and the first reference voltage $V_{REF}$. The operation after generating the second reference voltage $V_{REF'}$ of the embodiment shown in FIG. 4 is the same as which for the embodiment shown in FIG. 1, thus it is omitted for brevity here.

Figure 5:
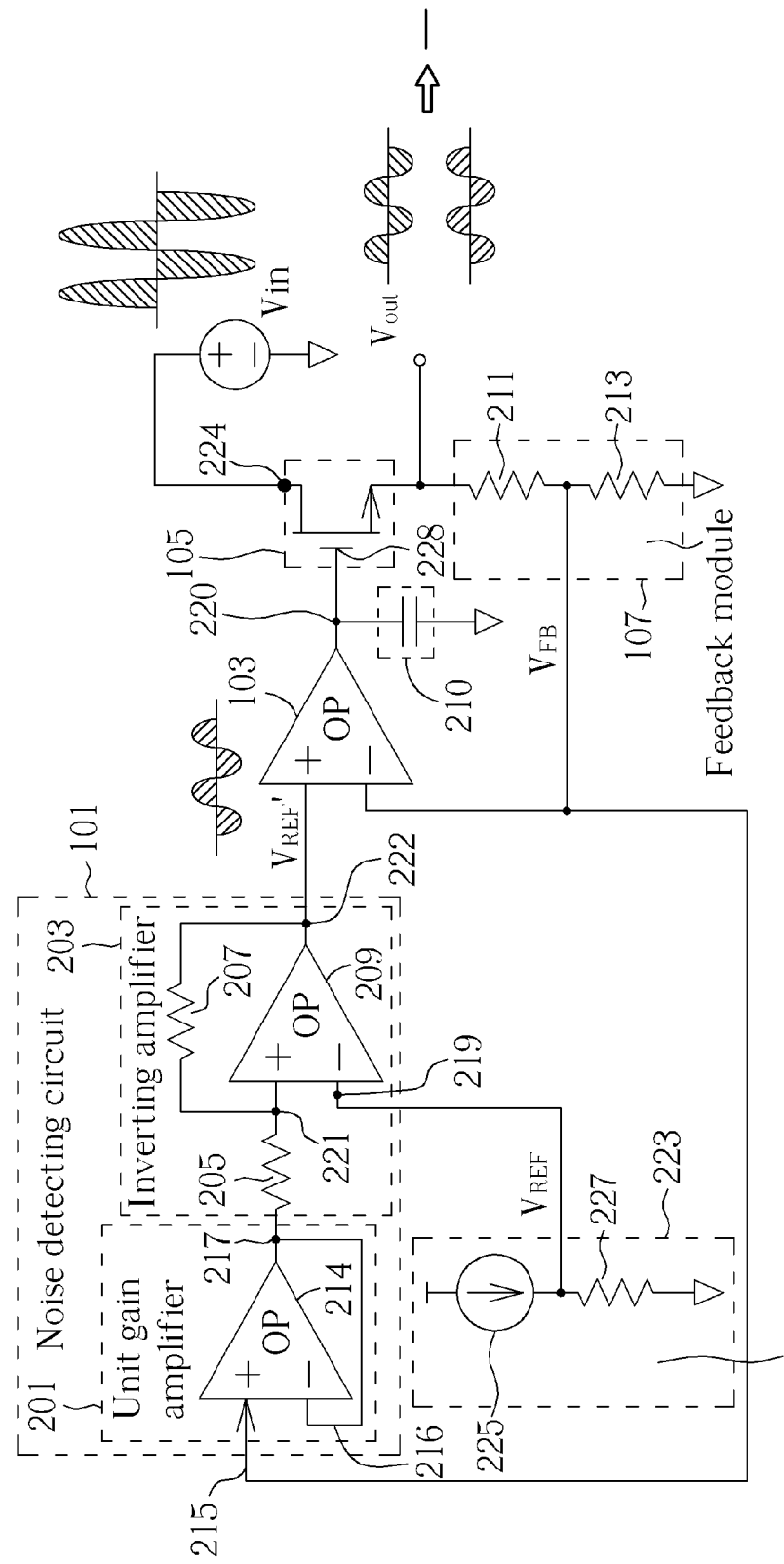
FIG. 5 and FIG. 6 are detail circuit diagrams for the power supplying circuit shown in FIG. 4 according to the present invention.
Figure 6:
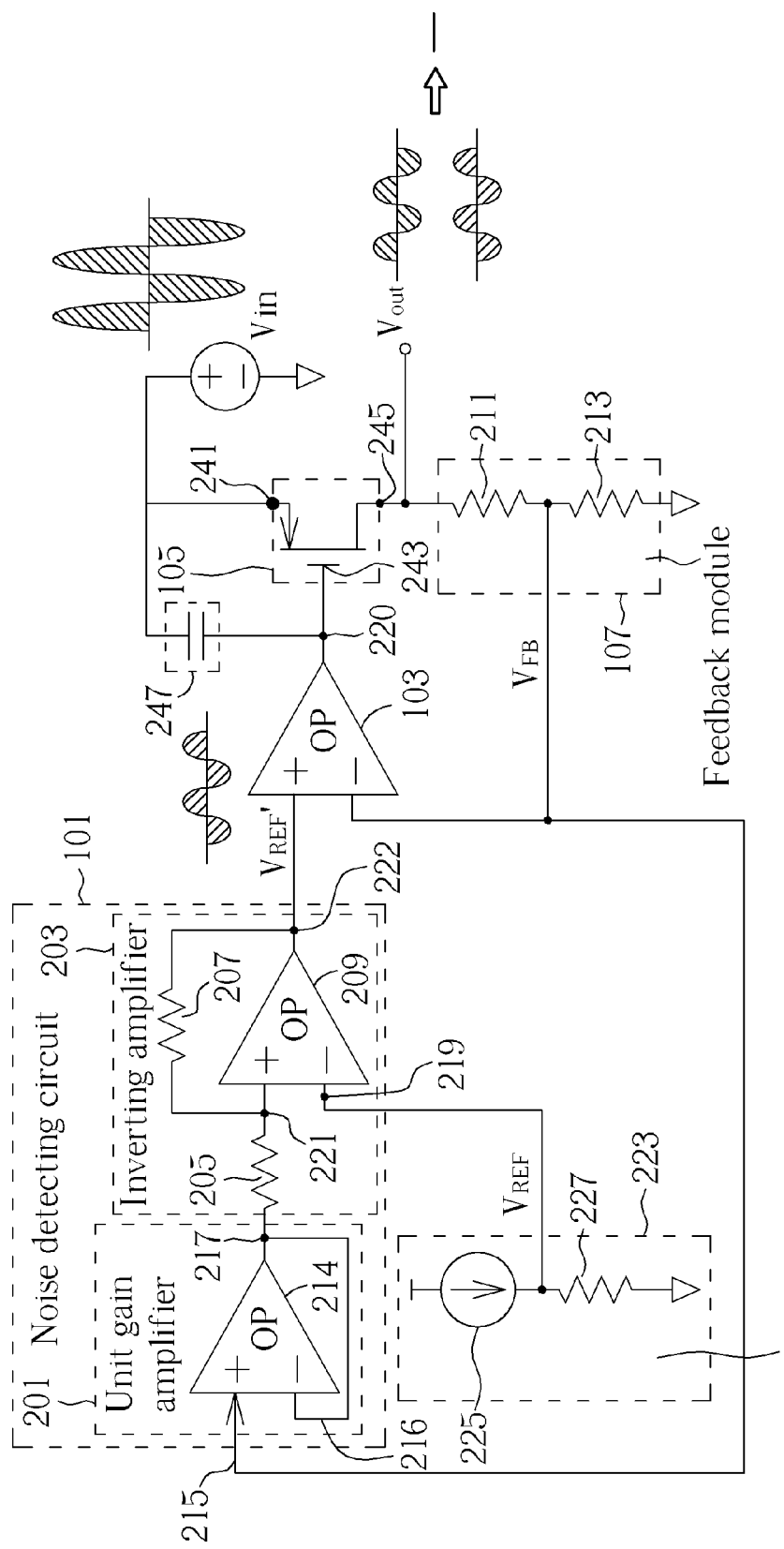

FIG. 5 and FIG. 6 are detail circuit diagrams for the power supplying circuit shown in FIG. 4 according to the present invention. The embodiment shown in FIG. 5 has the structure almost the same as which of the embodiment shown in FIG. 2(a). One difference between the two embodiments is that the noise detecting circuit 101 in FIG. 2(a) receives the output voltage $V_{out}$, but the noise detecting circuit 101 in FIG. 5 receives the feedback voltage $V_{FB}$. Accordingly, the unit gain amplifier 201 in FIG. 5 receives the feedback voltage $V_{FB}$ and buffers the feedback voltage $V_{FB}$, rather than the output voltage $V_{out}$. Similarly, the embodiment shown in FIG. 6 and the embodiment shown in FIG. 3 have almost the same structure. One difference between the two embodiments is that the noise detecting circuit 101 in FIG. 3 receives the output voltage $V_{out}$, but the noise detecting circuit 101 in FIG. 6 receives the feedback voltage $V_{FB}$. Therefore, the unit gain amplifier 201 in FIG. 6 receives the feedback voltage $V_{FB}$ and buffers the feedback voltage $V_{FB}$, rather than the output voltage $V_{out}$. The detail structures, operations and other characteristics of the embodiments shown in FIG. 5 and FIG. 6 are substantially the same as which of the embodiments shown in FIG. 2(a) and FIG. 3, thus are omitted for brevity here.

Figure 7:
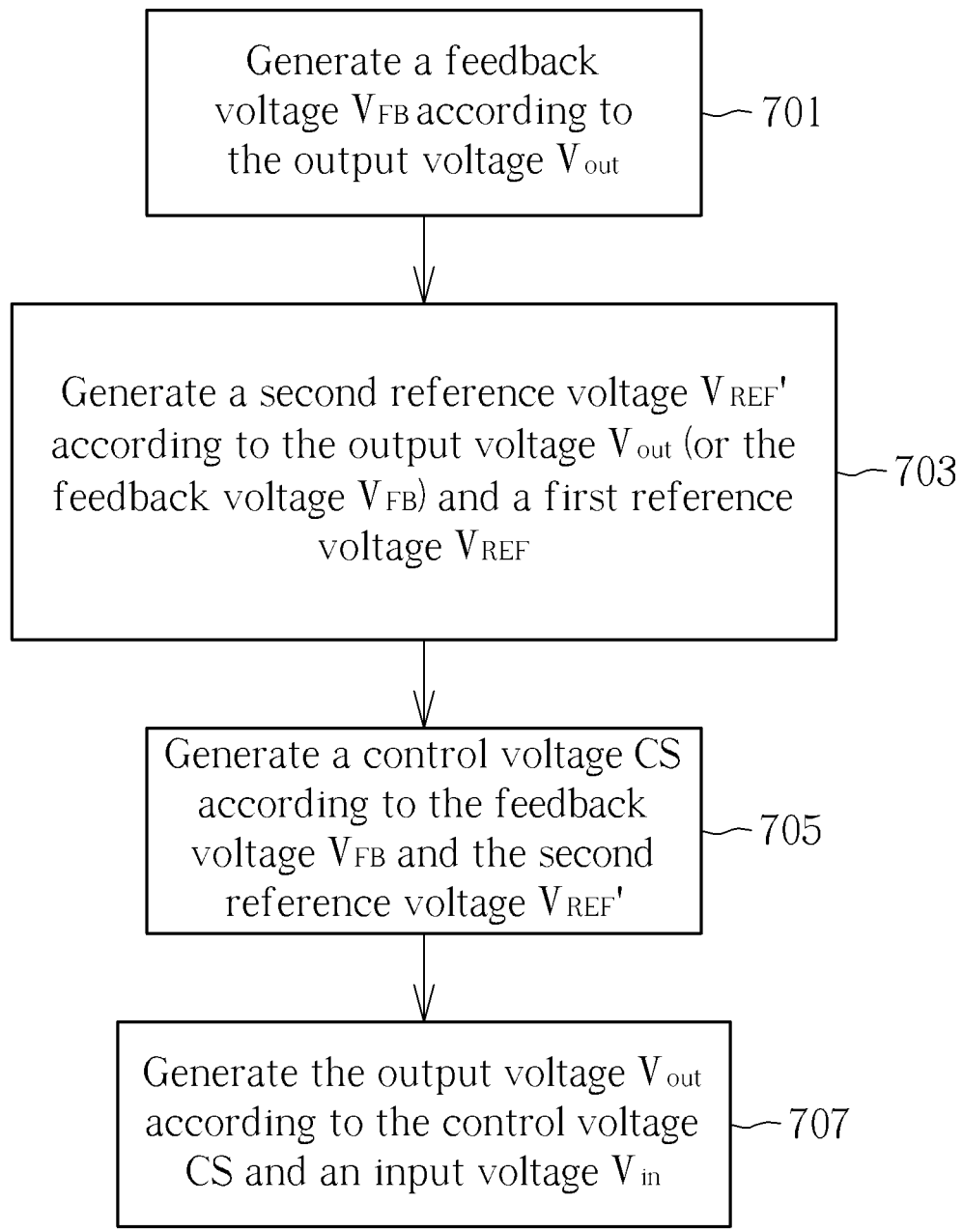
FIG. 7 is a flow chart illustrating a power supplying method according to the embodiment of the present invention.

In view of the above-mentioned embodiments, a power supplying method can be acquired. FIG. 7 is a flow chart illustrating a power supplying method according to the embodiment of the present invention, which includes following steps:

Step 701

Generate a feedback voltage $V_{FB}$ according to the output voltage $V_{out}$.

Step 703

Generate a second reference voltage $V_{REF'}$ according to the output voltage $V_{out}$ (or the feedback voltage $V_{FB}$) and a first reference voltage $V_{REF}$. A noise component of the second reference voltage $V_{REF'}$ is the same as which of the output voltage $V_{out}$.

Step 705

Generate a control voltage CS according to the feedback voltage $V_{FB}$ (or the output voltage $V_{out}$) and the second reference voltage $V_{REF'}$.

Step 707

Generate the output voltage $V_{out}$ according to the control voltage CS and an input voltage $V_{in}$.

Other detail characteristics of the power supplying method shown in FIG. 7 can be easily acquired based on above-mentioned embodiments, thus are omitted for brevity here.

In view of above-mentioned embodiments, the present invention can utilize an easy mechanism to restrain output voltage noise, to provide stable output voltage.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A power supplying circuit, for generating an output voltage, comprising:
    a noise detecting circuit, comprising at least one resistor, for receiving a first reference voltage and for generating a second reference voltage according to the output voltage and the first reference voltage, wherein a noise component of the second reference voltage is related to a noise component of the output voltage;
    a control voltage generating unit, for receiving a feedback voltage and the second reference voltage, and for generating a control voltage according to the feedback voltage and the second reference voltage;
    a voltage providing device, for generating the output voltage according to the control voltage and an input voltage; and
    a feedback module, comprising at least one resistor, for generating the feedback voltage according to the output voltage;
    wherein the noise detecting circuit comprises an isolating circuit to isolate an effect that the resistor of the noise detecting circuit and the resistor of the feedback module cause to each other.

2. The power supplying circuit of claim 1, wherein the noise component of the second reference voltage has an inverted phase with a noise component that the input voltage causes to the output voltage.

3. The power supplying circuit of claim 1, wherein the noise detecting circuit comprises:
    an inverting amplifier, comprising a first input terminal and a second input terminal, wherein the first input terminal receives the first reference voltage, the second input terminal substantially receives the output voltage, and the inverting amplifier accordingly generates the second reference voltage.

4. The power supplying circuit of claim 3, wherein the isolating circuit is a unit gain amplifier, for receiving the output voltage, and for buffering and outputting the output voltage to the second input terminal.

5. The power supplying circuit of claim 3, wherein the isolating circuit further comprises:
    a switch device, comprising a control terminal receiving the output voltage and an output terminal coupled to the second input terminal; and
    a current source, including a first terminal coupled to the output terminal of the switch device and a second terminal coupled to a predetermined voltage level.

6. The power supplying circuit of claim 1, wherein the noise detecting circuit generates the second reference voltage according to the feedback voltage and the first reference voltage.

7. The power supplying circuit of claim 6, wherein the noise detecting circuit comprises:
    an inverting amplifier, comprising a first input terminal and a second input terminal, wherein the first input terminal substantially receives the first reference voltage, the second input terminal receives the feedback voltage, and the inverting amplifier accordingly generates the second reference voltage.

8. The power supplying circuit of claim 7, wherein the isolating circuit is a unit gain amplifier, for receiving the feedback voltage and for buffering and outputting the feedback voltage to the second input terminal.

9. The power supplying circuit of claim 7, wherein the isolating circuit comprises:

a switch device, comprising a control terminal receiving the feedback voltage and an output terminal coupled to the second input terminal; and a constant current source, including a first terminal coupled to the output terminal of the switch device and a second terminal coupled to a predetermined voltage level.

10. The power supplying circuit of claim 1, wherein the power supplying device comprises an N type MOSFET, including a gate terminal receiving the control voltage, a drain terminal receiving the input voltage and a source terminal outputting the output voltage.

11. The power supplying circuit of claim 1, further comprising a capacitor, having a third terminal coupled to an output terminal of the control voltage generating unit, and a fourth terminal coupled to a predetermined voltage level for generating a dominant pole, wherein the noise detecting circuit, the control voltage generating unit and the capacitor are provided in a single chip.

12. The power supplying circuit of claim 1, wherein the noise detecting circuit and the control voltage generating unit receives the input voltage as an operating voltage.

13. A power supplying method applied to a power supplying circuit, for generating an output voltage, comprising:

generating a feedback voltage according to the output voltage via a feedback module comprising at least one resistor;

generating a second reference voltage according to the output voltage and a first reference voltage via a noise detecting circuit comprising at least one resistor, wherein a noise component of the second reference voltage is related to a noise component of the output voltage;

generating a control voltage according to the feedback voltage and the second reference voltage;

generating the output voltage according to the control voltage and an input voltage; and isolating an effect that the resistor of the noise detecting circuit and the resistor of the feedback module cause to each other.

14. The power supplying method of claim 13, wherein the noise component of the second reference voltage has an inverted phase with a noise component that the input voltage causes to the output voltage.

15. The power supplying method of claim 13, wherein the step of generating a second reference voltage according to the output voltage and a first reference voltage generates the second reference voltage according to the feedback voltage and the first reference voltage.

* * * * *